(12) United States Patent
Murphy et al.

(10) Patent No.: US 6,304,420 B1
(45) Date of Patent: Oct. 16, 2001

(54) PRELOADED GIMBAL IN A HEAD SUSPENSION FOR LIMITING HEAD/DISC SEPARATION

(75) Inventors: James Morgan Murphy, Boulder; Joshua Charles Harrison, Longmont, both of CO (US); Thomas R. Prentice, Luther, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/234,798

(22) Filed: Jan. 19, 1999

Related U.S. Application Data

(60) Provisional application No. 60/071,807, filed on Jan. 20, 1998.

(51) Int. Cl.[7] ................................................... G11B 5/48
(52) U.S. Cl. ................................................. 360/245.7
(58) Field of Search ........................... 360/245.1, 245.2, 360/244.2, 244.9, 245, 245.5, 245.3, 245.4, 245.6, 245.7, 97.02

(56) References Cited

U.S. PATENT DOCUMENTS

| | | | |
|---|---|---|---|
| 5,299,080 | * | 3/1994 | Mizuno ................................. 360/104 |
| 6,011,671 | * | 1/2000 | Masse .................................. 360/104 |
| 6,104,572 | * | 8/2000 | Williams .............................. 360/104 |

* cited by examiner

*Primary Examiner*—A. J. Heinz
(74) *Attorney, Agent, or Firm*—Westman, Champlin & Kelly, P.A.

(57) ABSTRACT

A head suspension assembly for mounting and supporting a head in a disc drive which includes a preloaded gimbal assembly. The preloaded gimbal assembly acts, during certain applied mechanical shock events, to prevent separation of the head and the disc which can lead to damaging contact between the head and the disc. Various design and manufacturing considerations necessary to implementation of the invention are disclosed.

12 Claims, 11 Drawing Sheets

PRELOADED GIMBAL IN A HEAD SUSPENSION FOR LIMITING HEAD/DISC SEPARATION

CROSS REFERENCE TO RELATED APPLICATION

This application claims the benefit of Provisional Application No. 60/071,807, filed Jan. 20, 1998.

FIELD OF THE INVENTION

This invention relates generally to the field of hard disc drives, and more particularly, but not by way of limitation, to an improved head suspension assembly including a modified gimbal structure for mounting the read/write heads in a disc drive which contributes to an increase in the mechanical shock tolerance of the disc drive.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write heads typically consist of an electromagnetic transducer carried on an air bearing slider. This slider acts in a cooperative hydrodynamic relationship with a thin layer of air dragged along by the spinning discs to fly the head in a closely spaced relationship to the disc surface. In order to maintain the proper flying relationship between the heads and the discs, the heads are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and heads, in accordance with the well-known Lorentz relationship. As the actuator bearing housing rotates, the heads are moved radially across the data tracks along an arcuate path.

Disc drives of the current generation are included in desk-top computer systems for office and home environments, as well as in laptop computers which, because of their portability, can be used wherever they can be transported. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, −5° C. to 60° C., and further be specified to be capable of withstanding operating mechanical shocks of 100 G or greater during disc drive operation. Moreover, future disc drive products are being developed which must be capable of withstanding non-operating shocks of up to 1000 G without becoming permanently inoperable.

One area of concern regarding mechanical shock tolerance is the structure used to mount and support the read/write heads within the disc drive. The head suspension, or flexure, which mounts and supports the heads consists of several portions which each have a specific function:

a mounting portion, usually stiffened by a relatively thick mounting plate, which is used to mount the head/flexure assembly to the moving actuator of the disc drive;

a load spring portion, adjacent the mounting portion, which serves to provide a downward (toward the disc surface) load force which counter-balances the hydrodynamic lifting force of the slider body carrying the read/write transducers to establish the desired flying height of the head;

a stiffened beam portion, extending from the load spring portion, which serves to transfer the load force of the load spring portion, and;

a gimbal portion, located at the distal end of the stiffened beam portion, which actually mounts the head, and is compliant in the head's roll and pitch axes, to allow the head to conform to minor variations in the surface of the discs, and stiff in the head's yaw and in-plane axes, to provide accurate positioning of the head's transducer relative to data recorded on the disc.

The gimbal portion also typically includes a load point dimple, or etched load point button, which provides a point-contact location for the application of the load force generated by the load spring portion to the head. Some prior art head suspension assemblies do not include such a load point dimple or load point button.

Design compromises in prior art head suspension assemblies contribute to an undesirable phenomenon typically referred to in the industry as "head slap". Head slap occurs when mechanical shocks are applied to the disc drive in an axis which causes the load force of the load spring portion of the head suspension to be overcome, allowing the head to rise away from its intended operational position with the disc. The head typically is held to the disc surface by a liquid miniscus. However, the stiffened beam portion of the head suspension is typically about ten times as massive as the gimbal and head combined, so that when the stiffened beam portion moves away from the disc in response to the application of mechanical shock, the head tends to remain in contact with the disc surface, and the gimbal portion of the head suspension deforms as the stiffened beam portion moves away from the disc. If the deflection of the stiffened beam portion is small enough, the head may remain in the proper relationship to the disc. If, however, the deflection of the stiffened beam is great enough, the force developed in the deforming gimbal portion becomes great enough to overcome the liquid miniscus between the head and the disc and the head is forced away from the disc toward the deflected stiffened beam portion.

At the termination of the shock event, the load force of the load spring portion of the head suspension causes the head to accelerate back toward the disc, and to cause direct, uncontrolled contact between the head and the disc. Such uncontrolled contact can readily result in damage to the disc surface or the head, either of which can be fatal to the proper operation of the disc drive.

The present invention is directed to prevention of such head slap events, thus increasing the disc drive's tolerance to applied mechanical shocks, and increasing the overall reliability of the disc drive.

SUMMARY OF THE INVENTION

The present invention is a head suspension assembly, for mounting and supporting a head in a disc drive, which includes a preloaded gimbal assembly. The preloaded gimbal assembly acts, during certain applied mechanical shock events, to prevent separation of the head and the disc which can lead to damaging contact between the heads and the discs. Various design and manufacturing considerations necessary to implementation of the invention are disclosed.

The manner in which the present invention is implemented, as well as other features, benefits and advantages of the invention, can best be understood by a review of the following Detailed Description of the Invention, when read in conjunction with an examination of the accompanying drawings.

DETAILED DESCRIPTION OF THE PREFERRED EMBODIMENTS

Figure 1:
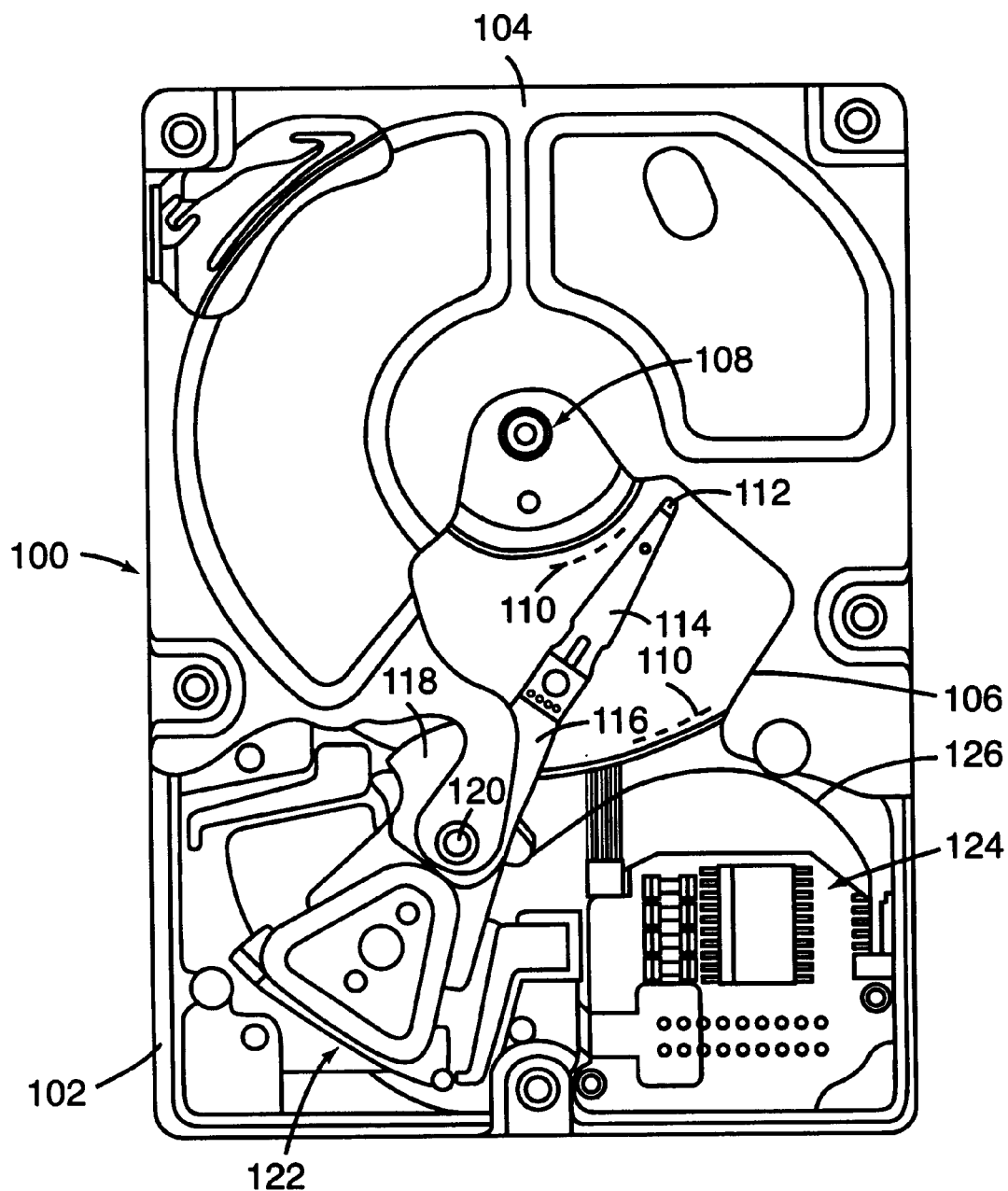
FIG. 1 is a plan view of a disc drive in which the present invention is particularly useful.

Turning now to the drawings and specifically to FIG. 1, shown is a plan view of a disc drive 100 in which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes one or more discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned heads (one of which is shown at 112). The heads 112 are supported by head suspensions, or flexures 114, which are attached to actuator head mounting arms 116. The actuator head mounting arms 116 are integral to an actuator bearing housing 118 which is mounted via an array of ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil (not separately designated) which is supported by the actuator bearing housing 118 within the magnetic field of an array of permanent magnets (also not separately designated) which are fixedly mounted to the base member 102, all in a manner well known in the industry.

Electronic circuitry (partially shown at 124, generally, and partially carried on a printed circuit board (not shown)) to control all aspects of the operation of the disc drive 100 is provided, with control signals to drive the VCM 122, as well as data signals to and from the heads 112, carried between the electronic circuitry 124 and the moving actuator assembly via a flexible printed circuit cable (PCC) 126.

Figure 2:
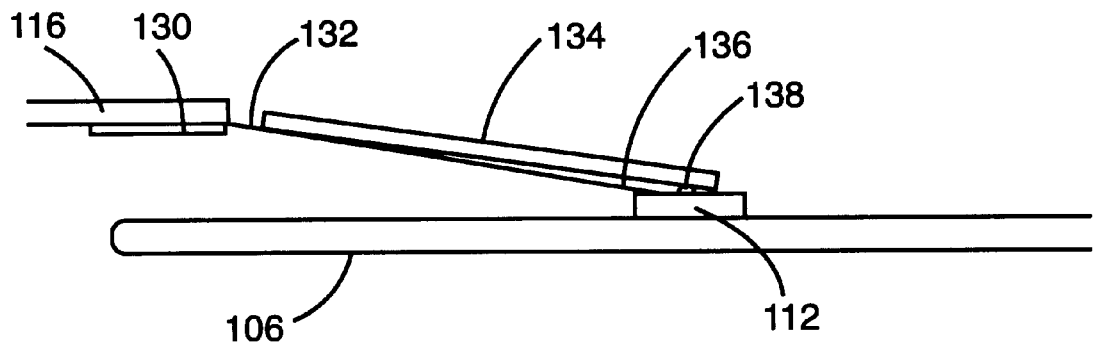
FIG. 2 is a simplified diagrammatic elevation view of a typical prior art head/head suspension assembly as mounted in a disc drive in cooperation with a disc, and showing the general relationship between assembly components.

FIG. 2 is a simplified diagrammatic elevation view of a typical prior art head/head suspension assembly as mounted in a disc drive in cooperation with a disc 106, and showing the general relationship between assembly components.

In FIG. 2, a single head 112 is shown in cooperative arrangement with the surface of the disc 106. It is well known in the art to have a head 112 associated with each surface of the disc 106, and FIG. 2 shows only a single head 112, and associated mounting and support components, purely for clarity.

It is also well known in the art that the head 112 includes a transducer (not separately shown) for recording data on and retrieving data from a magnetic layer (also not separately shown) on the disc 106, and an arrangement of air bearing surfaces (not separately designated) for acting in conjunction with air dragged along by the spinning disc 106 to fly the head 112 above the disc surface. Disc drives of the present technology typically include heads 112 that operate at flying heights of 1.5 microinches or less above the disc 106.

A typical actuator head mounting arm 116, used to connect the head 112 to the actuator of the disc drive, is also shown in FIG. 2.

A head suspension, or flexure, (114 in FIG. 1) is included in the disc drive between the head mounting arm 116 and the head 112, and commonly consists of the following components: 1) a mounting plate 130 which serves to provide a robust mounting surface to connect the head suspension 114 to the head mounting arm; 2) a load spring portion 132 which is preformed during manufacture to apply a load force toward the disc surface to counter the hydrodynamic lifting force of the head's air bearing surfaces; 3) a stiffened beam portion 134 which transfers the load force generated in the load spring portion 132 to the head 112, and; 4) a gimbal portion 136 to which the head 112 is attached. The load spring portion 132 and stiffened beam portion 134 of the head suspension 114 are typically formed of stainless steel foil 0.025 inches thick, with additional stiffness imparted to the stiffened beam portion 134 by mechanically forming the lateral edges of the stiffened beam portion 134 out of plane from the remainder of the stiffened beam portion 134.

The gimbal portion 136 is typically formed from stainless steel foil having a thickness of 0.010 inches, rendering the gimbal portion 136 relatively flexible in relationship to the remainder of the head suspension. This relative flexibility, along with other well known features of the gimbal portion 136, serves to make the gimbal portion 136 compliant in the roll and pitch axes of the head 112, while maintaining relative stiffness in the yaw and in-plane axes of the head 112.

The stiffened beam portion 134 usually passes the load force generated by the load spring portion 132 to the head 112 through a load point dimple, or load point button, 138. This load point dimple 138 can be physically located on that part of the gimbal portion 136 attached to the head 112 and extend upward into contact with the stiffened beam portion 134, as shown in FIG. 2, or can be formed as a feature of the stiffened beam portion 134 extending downward into contact with the upper surface of the head 112. In either case, the load point dimple 138 provides a substantially single-point contact which allows the head 112 to pivot in relationship to the stiffened beam portion in the desired compliant axes.

It should be noted before moving on that FIG. 2 is intended for discussion of component relationships only. In actual disc drives of the present technology, the head mounting arm 116 would be relatively closer to the surface of the disc 106, with the stiffened beam portion 134 of the head suspension more closely in parallel with the disc surface. Such spacing allows for closer spacing between adjacent discs, and allows more discs and associated heads to be incorporated in a disc drive of a particular form factor, or for physically smaller disc packaging for any given number of heads and discs.

Figure 3:
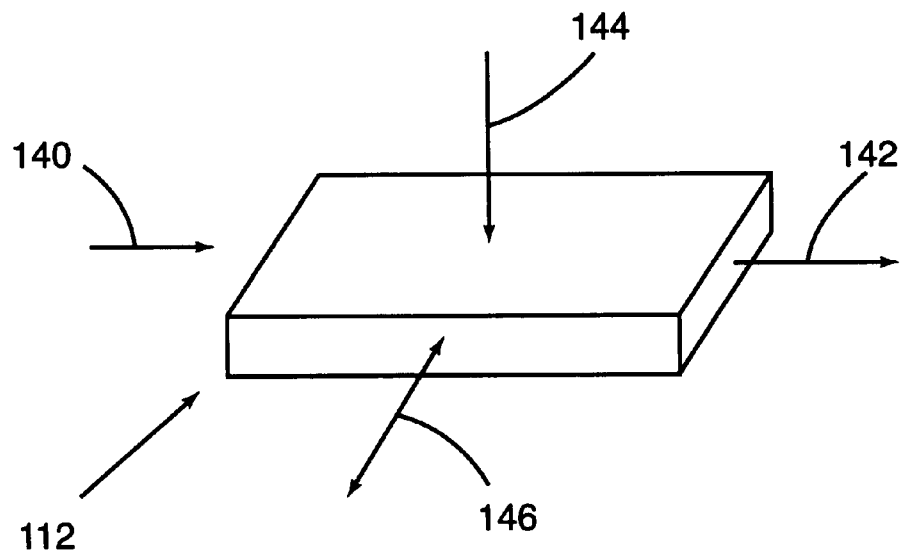
FIG. 3 is a diagrammatic isometric view of a disc drive head, showing the static and dynamic forces acting on the head during normal disc drive operation.

Turning now to FIG. 3, shown is a simplified diagrammatic isometric view of a head 112, showing the static and dynamic forces applied to the head 112 during normal disc drive operation.

As can be seen in FIG. 3, the head 112 is generally in the shape of a rectilinear solid, and the direction of disc motion relative to the head 112, as represented by arrow 140, is generally in parallel with the major axis of the head 112, or along the length of the head 112. This relative motion imparts frictional and hydrodynamic drag force to the head, as represented by arrow 142, which is again exerted generally along the length of the head 112. It is well known in the disc drive industry that rotary actuators, such as that shown in FIG. 1, impart certain amounts of skew angle between the major axis of the heads 112 and the direction of disc motion 140 as the heads 112 are moved from track to track on the disc surface. However, the effects of such skew are typically compensated for in the design of the air bearing surfaces of the head 112, and, as such, are not of particular importance for discussion of the present invention.

It is common in disc drives of the current technology for the head suspension to be attached to the head 112 such that it extends in parallel with the length of the head 112. This means that during normal disc drive operation, the frictional and hydrodynamic drag forces exerted on the head 112 along arrow 142 are also exerted along the length of the head suspension, and are balanced by the longitudinal stability of the head suspension.

The load force generated by the load spring portion (132 in FIG. 2) of the head suspension is applied to the head 112 along the axis represented by arrow 144, that is, in parallel with the minor axis or height of the head 112. The specific location for application of the load force to the head 112 is determined, in a well known manner, in order to provide the desired flying attitude of the head 112. The load force exerted on the head 112 along arrow 144 is counterbalanced during normal disc drive operation by the hydrodynamic lifting force of the air bearing surfaces of the head 112, and the precise balance between these forces establishes the nominal flying height of the head 112 above the disc surface.

The final major force exerted on the head 112 during normal disc drive operation is exerted on the head 112 by the actuator during movement of the head 112 from track to track, and is represented in FIG. 3 by bidirectional arrow 146. As can be seen in FIG. 3, this force is exerted on the head 112 in an axis perpendicular to the length of the head 112, or in parallel with the width of the head 112. Such lateral forces on the head 112 must be countered by the yaw and in-plane stiffness characteristics of the head suspension in order to allow accurate placement of the head 112 in relationship with the data tracks (110 in FIG. 1) on the discs.

An analysis of FIG. 3 reveals that the hydrodynamic drag force 142 and load force 144 are largely static forces that vary significantly only with changes in the relative linear velocity between the head 112 and the disc brought about by movement of the head 112 to various tracks on the disc. Similarly, the lateral forces 146 exerted on the head 112 are dynamic during seeking of the actuator from track to track, and are substantially zero when the head 112 is stationary over a particular track. Thus the forces applied to the head 112 during normal disc drive operation are substantially balanced, resulting in a nominally static relationship between the head 112 and the disc.

This balancing of forces on the head 112 is disrupted, however, when the disc drive is subjected to applied mechanical shocks.

FIGS. 4 through 7 illustrate the effects of mechanical shocks applied to a disc drive which can lead to the undesirable phenomenon of head slap, and show the uncontrolled variation in component relationships that results.

Figure 4:
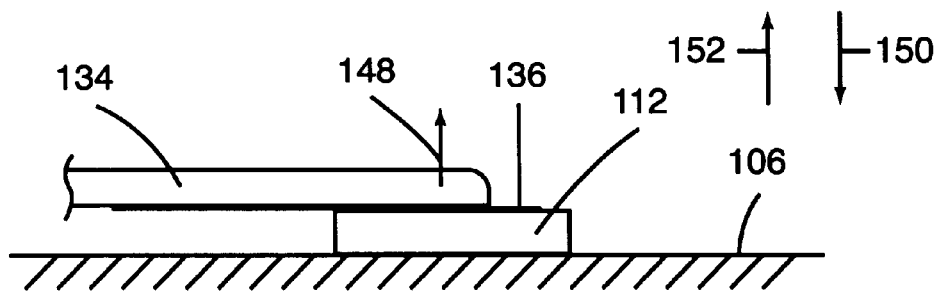
FIG. 4 is a simplified diagrammatic elevation view of a prior art disc and head/head suspension assembly showing the first stage of a response to applied mechanical shock leading to head slap.

FIG. 4 shows the forces exerted on the head suspension components by application of a mechanical shock which is normal to the plane of the disc 106. Such forces cause the stiffened beam portion 134 of the head suspension to lift away from the disc 106 in the direction of arrow 148, and can result when the force is directed either toward the disc 106, as shown by arrow 150, or away from the disc 106, as shown by arrow 152. This is because forces exerted in the direction of arrow 150 tend to move the disc away from the head suspension due to the inertia of the head suspension, and because forces exerted in the direction of arrow 152 tend to bend the head suspension toward the disc 106, storing stresses in the head suspension which, when released, tend to move the head suspension away from the disc 106. In either case, the resultant relative movement in the stiffened beam portion 134 of the head suspension is thus away from the disc in the direction of arrow 148. The effect of this relative motion is illustrated in the following figures.

Figure 5:
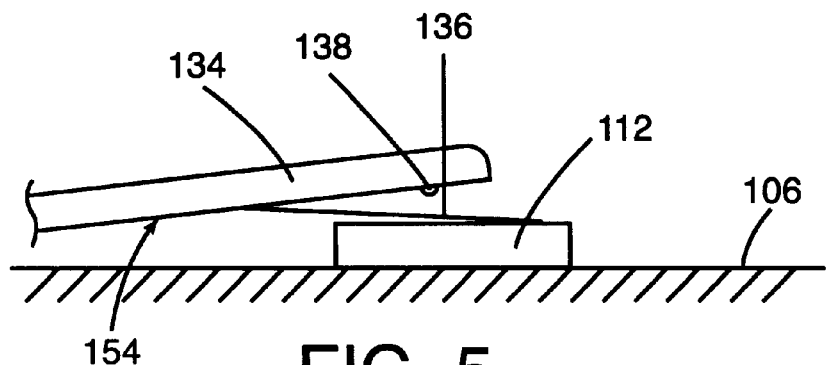
FIG. 5 is a simplified diagrammatic elevation view of a prior art disc and head/head suspension assembly showing the second stage of a response to applied mechanical shock leading to head slap.

FIG. 5 shows the second stage results on component relationships that occur from application of mechanical shock normal to the disc surface. As can be seen in the figure, the stiffened beam portion 134 of the head suspension has moved upward relative to the disc 106. At the same time, the head 112 remains in substantially the same relationship to the disc 106 as before the application of the mechanical shock. This is due to the fact that the hydrodynamic meniscus formed between the head 112 and the disc 106 is initially stronger than the force applied to the head 112 by the relatively flexible gimbal portion 136 of the head suspension. As can be seen, the separation of the head 112 from the stiffened beam portion 134 of the head suspension causes the gimbal portion 136 to be bent, accumulating stresses in the gimbal portion 136, since the gimbal portion is welded to the stiffened beam portion 134 only at one end, designated generally by arrow 154, and typically adhesively bonded to the upper surface of the head 112 at the other end.

It should be noted before further discussion that the load point dimple 138 in the example head suspension shown in FIG. 5 is formed as part of the stiffened beam portion 134, but that the effects which will be discussed below will be similar even if the load point dimple 138 were formed on that portion of the gimbal portion 136 bonded to the head 112.

Figure 6:
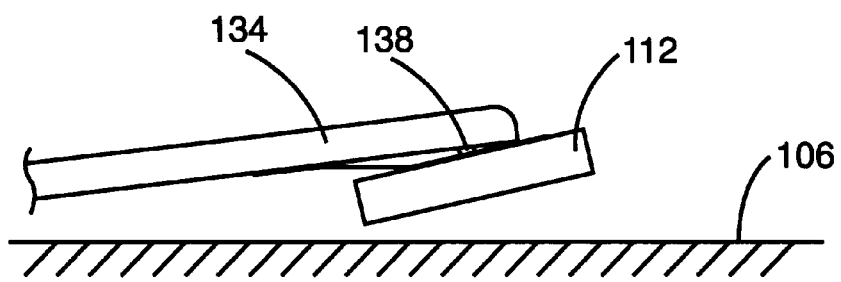
FIG. 6 is a simplified diagrammatic elevation view of a prior art disc and head/head suspension assembly showing the third stage of a response to applied mechanical shock leading to head slap.

FIG. 6 shows the component relationship that occurs in the next stage of the shock event, once the stresses built up in the gimbal portion 136 become great enough to overcome the hydrodynamic meniscus force holding the head 112 to the disc 106. When this occurs, the head 112 is drawn rapidly upward into contact with the load point dimple 138 on the stiffened beam portion of the head suspension. Contact between the head 112 and the load point dimple 138 imparts roll and pitch moments to the head 112, since the load point dimple 138 is typically not located exactly opposite the mass center of the head 112. Offsetting of the load point dimple contact point from the mass center of the head 112 is done to compensate for bias applied to the head 112 by lead wires, to control flying attitude of the heads 112 and other reasons familiar to those of skill in the art.

FIG. 6 shows the effect of the applied roll and pitch moments to the head 112 as a relative pitch difference between the head assembly 112 and the stiffened beam portion 134 of the head suspension, but it should be recalled that the overall effect of the contact between the head 112 and the load point dimple 138 could be relative roll, pitch or a combination of both. Regardless of the particular effect on head/head suspension attitude, such attitude variation generates another form of non-standard stresses within the gimbal portion 136 of the head suspension. The significance of the figure is to show that the attitude of the head 112 relative to the head suspension is no longer controlled by balanced forces as was discussed above in regard to FIG. 3 and as shown at the beginning of the shock event in FIG. 4.

Figure 7:
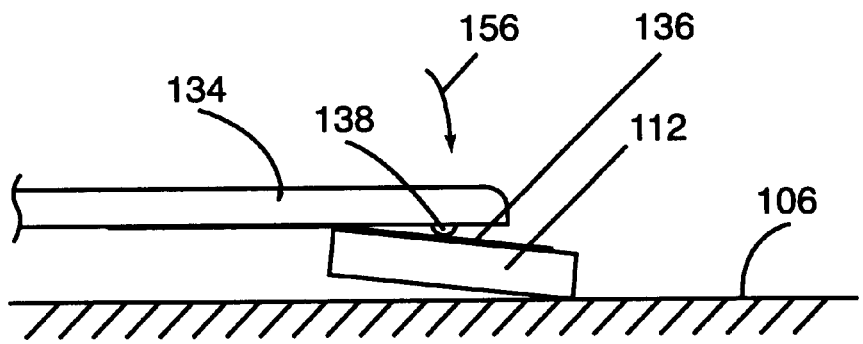
FIG. 7 is a simplified diagrammatic elevation view of a prior art disc and head/head suspension assembly showing the fourth stage of a response to applied mechanical shock leading to head slap.

FIG. 7 shows the fourth and final stage of a shock event that induces head slap. At the termination of the shock event, the stiffened beam portion 134 of the head suspension returns to its normal loaded condition, as represented by arrow 156. Meanwhile, the head 112 is supported only by the gimbal portion 136 of the head suspension, and is free to pivot about the load point dimple 138 in response to the uncontrolled stresses accumulated within the gimbal portion 136 noted above in the discussion of FIG. 6.

The uncontrolled pivoting of the head 112 can cause the head 112 to come into contact with the disc 106 with a tilted attitude, such as that shown in FIG. 7. Since the head 112 is not in its intended flat, parallel relationship to the disc surface, an edge or corner of the head 112 may come into direct contact with the disc 106. Such contacts can cause damage to the thin magnetic recording layer on the disc 106, the head 112 or both, and such damage can be fatal to the operation of the disc drive.

It should be noted here that the angles of components and separation of the head 112 from the disc 106 shown in FIGS. 5 through 7 have been exaggerated for illustration purposes.

Typical prior art solutions to the head slap phenomenon described above have simply been to increase the load force exerted by the load spring portion (132 in FIG. 2) of the head suspension (so that it is more difficult for the load beam to lift away from the disc), to attempt to prevent mechanical excitation of the system by minimizing the mass of head mounting mechanisms and head suspension, and ensuring that system resonances do not occur at frequencies that contribute to the problem.

Increasing the load force, however, can lead to friction and/or wear problems at the head/disc interface. Furthermore, with the increases in specified shock tolerance in current and future disc drive products, increasing the load force is not a long term solution.

The current invention is directed to elimination of head slap damage by preventing the lifting of the head 112 from the disc 106. Implementation of the invention provides dramatic improvement in the mechanical shock tolerance of disc drives, and/or improved tribological performance of the head/disc interface through the inclusion of lower head load forces.

Figure 8:
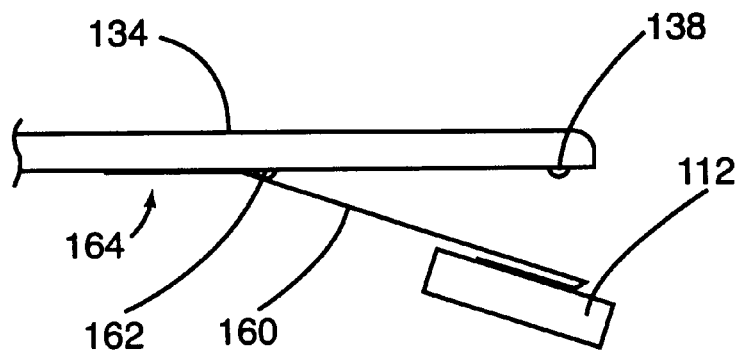
FIG. 8 is a simplified diagrammatic elevation view of a head/head suspension assembly made in accordance with the present invention, showing component relationships when the head suspension is in an unloaded condition.
Figure 9:
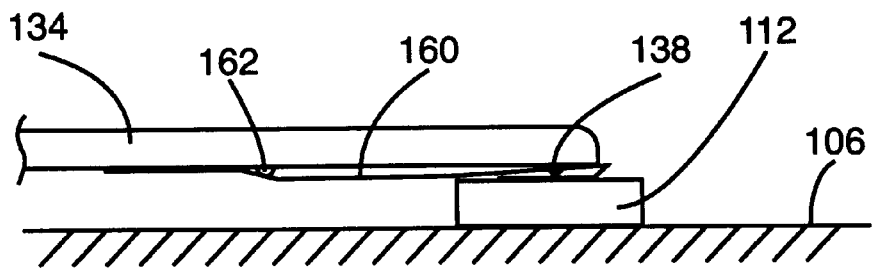
FIG. 9 is a simplified diagrammatic elevation view of the head/head suspension of FIG. 8, showing component relationships when the head suspension is in a loaded condition.
Figure 10:
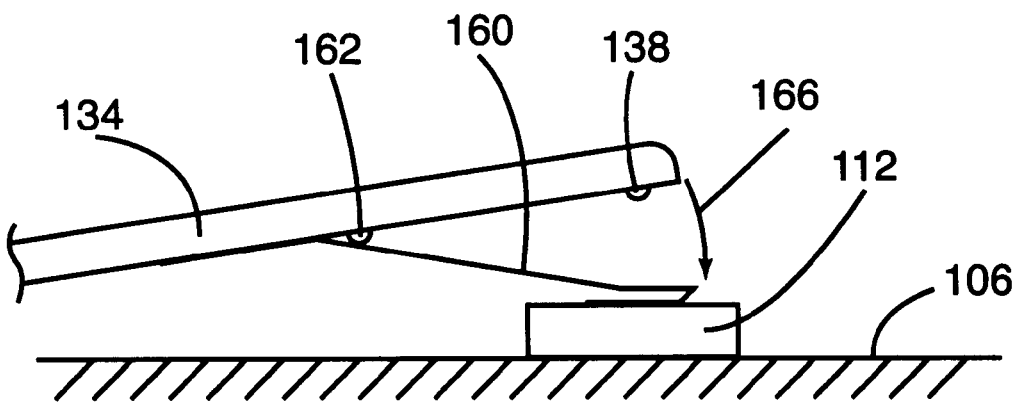
FIG. 10 is a simplified diagrammatic elevation view showing the response of the head/head suspension assembly of FIGS. 8 and 9 to an applied shock event.

FIGS. 8 through 10 are simplified diagrammatic elevation views illustrating the preloaded gimbal structure of the present invention and its response to applied mechanical shock.

FIG. 8 shows a first embodiment of the head suspension of the present invention in an "as-assembled" unloaded condition. The head suspension includes a stiffened beam portion 134, such as those previously discussed, which includes, in the example shown, a load point dimple 138 near its distal end. It should be recalled that the load point dimple 138 could be formed on that portion of the gimbal portion used to mount the head 112 without exceeding the scope of the present invention.

The head suspension of FIG. 8 also includes a preloaded gimbal portion 160 that mounts the head 112 at its distal end. Preloading of the gimbal portion 160 is accomplished though the inclusion of a secondary gimbal preload dimple 162 on the stiffened beam portion 134. When the proximal region of the gimbal portion 160 is welded to the stiffened beam portion 134, in the area generally designated by arrow 164, the gimbal portion 160 is bent away from the stiffened beam portion 134 by the gimbal preload dimple 162. It should be noted here that the gimbal preload dimple 162 could also be formed on the upper surface of the gimbal portion 160 and accomplish the same function, and that the gimbal preload dimple 162 can be formed by stamping, "coining", material deposition processes or other methods, all envisioned to fall within the intended scope of the present invention.

The actual angle that the gimbal portion 160 assumes relative to the stiffened beam portion 134 is readily determined by control of the dimensions of the gimbal preload dimple 162 and the proximity of the gimbal preload dimple to the location 164 of the weld between the gimbal portion 160 and the stiffened beam portion 134. The function of the preloaded gimbal portion 160, as it relates to mechanical shocks applied to the disc drive, will be discussed below.

FIG. 9 shows the head suspension including the preloaded gimbal 160 of the present invention as it appears when operatively engaged with a disc 106. In FIG. 9, it can be seen that the stiffened beam portion 134 of the head suspension lies substantially in parallel with the surface of the disc 106, and that the load point dimple 138 provides point contact between the stiffened beam portion 134 and the head 112. Once again, it should be recalled that the load point dimple 138 can be formed either on the stiffened beam portion 134 or on that part of the gimbal 160 used to attach the head 112.

FIG. 9 shows that, when the stiffened beam portion 134 and head 112 are in their intended relationship to the disc 106, the gimbal portion 160 is bent back over the gimbal preload dimple 162, introducing spring stresses into the gimbal portion 160.

During normal disc drive operation, the head suspension operates similarly to those of the prior art. That is, the total net load force applied to the head 112 is still the load force generated by the load spring portion (132 in FIG. 2) of the head suspension, but this net load force is now applied primarily through the load point dimple 138, and to a lesser extent directly to the head 112 by the gimbal portion 160. It is one of the advantages of the present invention that the net load force applied to the head 112 is the same as in prior art head suspensions, eliminating the necessity of redesigning the air bearing elements of the head 112. It is only during applied mechanical shock events that the improved head suspension of the present invention exhibits its principle advantageous characteristics.

FIG. 10 shows the response of a head suspension made in accordance with the present invention to mechanical shock applied normal to the plane of the disc 106. Such applied mechanical shocks tend to lift the stiffened beam portion 134 of the head suspension away from the disc 106, as was explained above with regard to FIG. 5. Once again, it should be noted that the separation between the stiffened beam portion 134 and the disc 106 is exaggerated for illustrative purposes.

In the case of FIG. 10, however, the preload force of the gimbal portion 160 acts in the opposite direction of such lifting of the stiffened beam portion 134, i.e., along arrow 166. Thus the preload force acts, in concert with the meniscus force between the head 112 and disc 106 during non-operating conditions, to maintain the head 112 in its intended operational relationship with the disc 106.

At the termination of the shock event, the stiffened beam portion 134 returns to its normal position relative to the disc 106, as shown in FIG. 9. When this occurs, the only contact is between the stiffened beam portion 134 and the head 112 at the load point dimple 138, and this contact is approximately centered on the head 112. Thus, the force of reestablishing contact between the stiffened beam portion 134 and the head 112 is spread over the entire surface area of the head 112 and not localized at an edge or corner of the head 112, and is thus much less likely to cause damage to either the head 112 or disc 106.

Similarly, if a shock event which causes load point dimple separation occurs during normal disc operation, the intended flying relationship between the head 112 and the disc 106 is not disturbed, and the contact between the stiffened beam portion 134 and the head 112 at the termination of the shock event is spread over the entire air bearing between the head 112 and the disc 106, and is, again, much less likely to cause damage to either the head 112 or the disc 106.

Now that the principle of the invention has been explained, discussion of various manufacturing techniques and embodiments of the invention can be undertaken.

Figure 11:
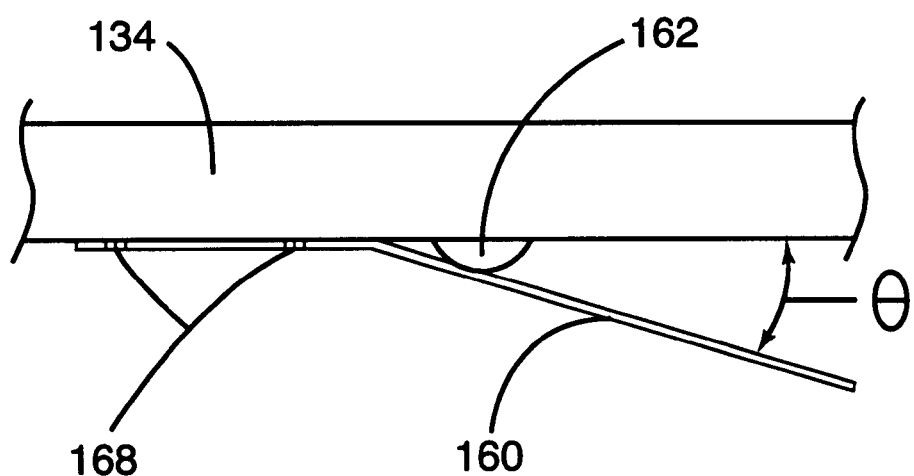
FIG. 11 is a detail elevation view of a head suspension assembly made in accordance with a first embodiment of the present invention.

FIG. 11 is a detail elevation view of a head suspension manufactured in accordance with a first embodiment of the invention, similar to that described in regard to FIGS. 8 through 10 above. Once again, the vertical component relationships are exaggerated in the figure for illustrative purposes. This technique of implementing the present invention will be referred to hereinafter as the "dimple method".

In the dimple method, a gimbal preload dimple 162 is formed in either the stiffened beam portion 134 or the gimbal portion 160 of the head suspension. This gimbal preload dimple 162 is formed in close proximity to the spot welds 168 used to connect the gimbal portion 160 to the stiffened beam portion 134. Thus, when the gimbal portion 160 is clamped by a tooling fixture (not shown) to allow the spot welding to be done, the distal portion of the gimbal portion 160 is bent at the location of the gimbal preload dimple 162, bending the gimbal portion 160 at an angle θ relative to the stiffened beam portion 134. The angle θ is selected based on other characteristics of the disc drive, such as maximum shock specifications, mass of the head 112, and other elements well known to those of skill in the art.

The dimple method of implementation of the present invention has several advantages: 1) it does not require any additional forming operations over the prior art, since the gimbal preload dimple 162 can be formed at the same time as other features are stamp formed in either the stiffened beam portion 134 or gimbal portion 160; 2) it results in highly repeatable preload force on the gimbal portion 160; and 3) it provides head suspensions with low pitch and roll static attitude (PSA/RSA) variation. The dimple method of implementation of the present invention does, however, produce a head suspension that includes a gimbal that does not lie completely flat when assembled in cooperation with a disc, and which has a relatively short effective bending length when compared to a second method to be discussed below. This may result in difficulties during certain disc drive manufacturing operations, such as the merging of the head stack assembly with the disc stack.

Figure 12:
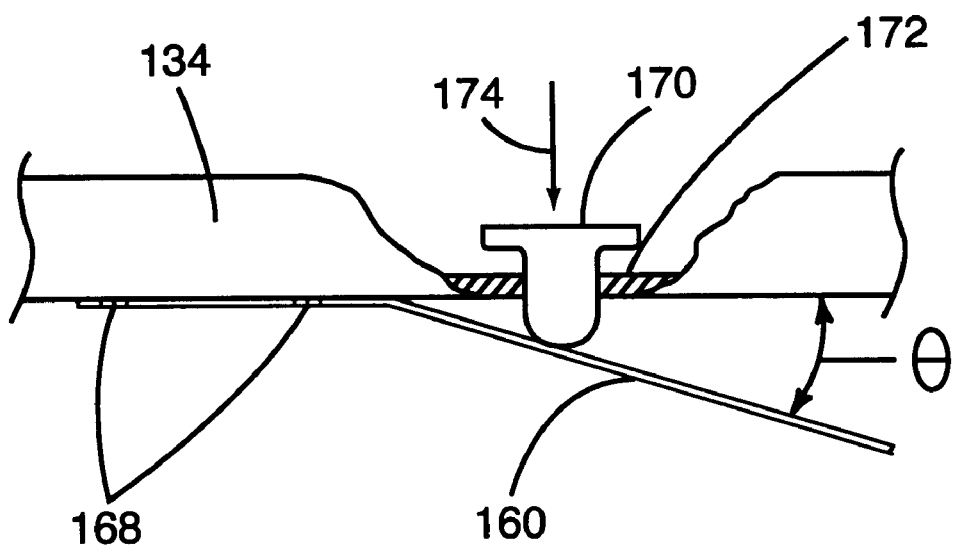
FIG. 12 is a detail elevation view of a head suspension assembly made in accordance with a second embodiment of the present invention.

FIG. 12 illustrates a second proposed embodiment of the present invention, hereinafter referred to as the "direct forming method".

FIG. 12 is a detail elevation view of a head suspension made in accordance with the present invention and the direct forming method. In the direct forming method, the gimbal portion 160 is spot welded to the stiffened beam portion 134 (shown in partial cutaway) of the head suspension at spot welds 168, with the planar gimbal portion 160 lying substantially in parallel with the stiffened beam portion 134. Then a forming tool 170 is inserted through a cooperative opening or slot 172 in the stiffened beam portion 134 and brought to bear on the gimbal portion 160. The forming tool is then forced downward, in the direction of arrow 174, to an extent that plastically deforms the gimbal portion 160 to the desired angle θ. This plastic deformation requires that the forming tool 170 deform the gimbal portion 160 beyond angle θ, so that when the forming tool 170 is removed, the gimbal portion 160 can relax back to angle θ.

A force on the order of about 8–10 grams is expected to be required to plastically deform the gimbal portion 160. Such a force is well above the nominal head load force generated by the load spring portion (132 in FIG. 2) of the head suspension. Thus, the plastic deformation of the gimbal portion, which provides the desired gimbal preload, will not be overcome by the application of normal operational load forces when the entire head/head suspension assembly is placed into cooperative engagement with the disc.

This embodiment of the present invention also has several advantages: the bending length is equal to the full distance between the head (not shown) and the spot welds 168. This means that the head suspension can have maximum compliance to resist separation of the head from the disc during shock events, and the gimbal portion 160 can lie substantially flat and parallel with the stiffened beam portion 134 when the head is in its intended cooperative relationship with the disc.

Several design aspects must be considered to optimize the present invention.

Firstly, the design must allow sufficient excursion of the stiffened beam portion 134 of the head suspension before the head 112 is subjected to any lifting force. This means that the free deflection of the gimbal portion must be on the same order as the typical stiffened beam portion excursion distance during shock events. This is readily accomplished with the present invention.

Secondly, the gimbal preload force should be relatively small compared with the total load force applied by the suspension to the head. Resistance to forces applied laterally to the heads, such as those produced during head seeks and laterally applied shocks, is a function of the frictional contact between the stiffened beam portion of the head suspension and the head at the load point dimple. Therefore it is desirable that the load force applied at the load point dimple be relatively large. The preload applied to the gimbal portion by the present invention is directly subtracted from this overall load force, however, and therefore must be relatively small. The gimbal preload in the present invention is envisioned to be on the order of 5% to 10% of the total head suspension load force, and the inertia of the head and gimbal are significantly less than the inertia of the stiffened beam portion of the head suspension, thus satisfying this design criterion.

Thirdly, the implementation of the invention should not degrade the other mechanical characteristics of the gimbal portion of the head suspension, especially those portions of the gimbal which must be relatively stiff. The present invention can be implemented without negatively impacting the yaw and in-plane stiffness of the head suspension.

Finally, the implementation of the invention should not degrade the manufacturability of the head suspension or the disc drive. As will be discussed in more detail below, the present invention can be implemented with minimal effect on the manufacture of the head suspension and the disc drive.

Implementation of the present invention can be accomplished through modification of existing head suspension designs.

Figure 13:
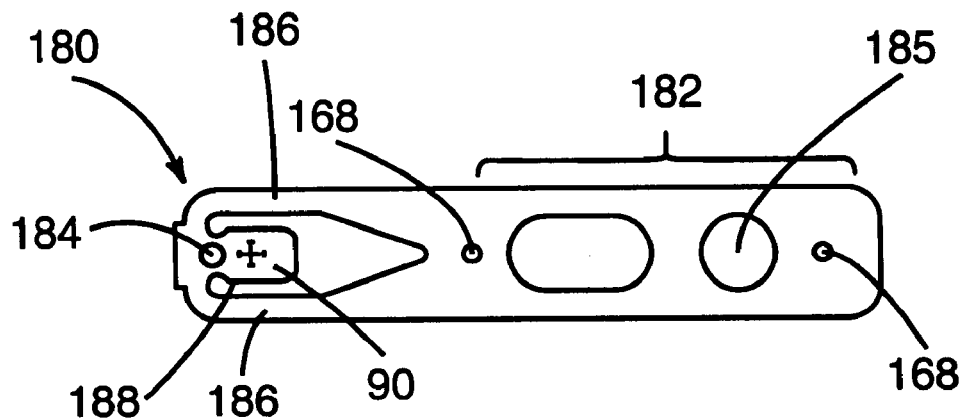
FIG. 13 is a plan view of a prior art gimbal assembly.

FIG. 13 is a plan view of a prior art gimbal portion 180, referred to as a "series 850" gimbal. The series 850 gimbal 180 includes several functional portions:

1) a mounting portion 182 within which the spot welds 168 to attach the gimbal 180 to the stiffened beam portion of the head suspension are located;
2) a number of tooling holes 184, 185 which interact with pin elements on tooling fixtures (not shown) to align the gimbal 180 with the stiffened beam portion during the spot welding process;
3) a pair of gimbal beams 186, which are compliant in the roll and pitch axes of the head, and stiff in the yaw and in-plane axes of the head; and
4) a head mounting tab 188 to which the head is adhesively attached.

The load point dimple which provides a point contact between the gimbal 180 and the stiffened beam portion of the head suspension can be formed either directly on the head mounting tab 188 or at a corresponding location on the stiffened beam portion, as represented by dashed circle 190.

Before proceeding to a discussion of modifications to the series 850 gimbal which facilitate implementation of the present invention, a general discussion of some of the characteristics of cantilever beams is in order.

Figure 14:
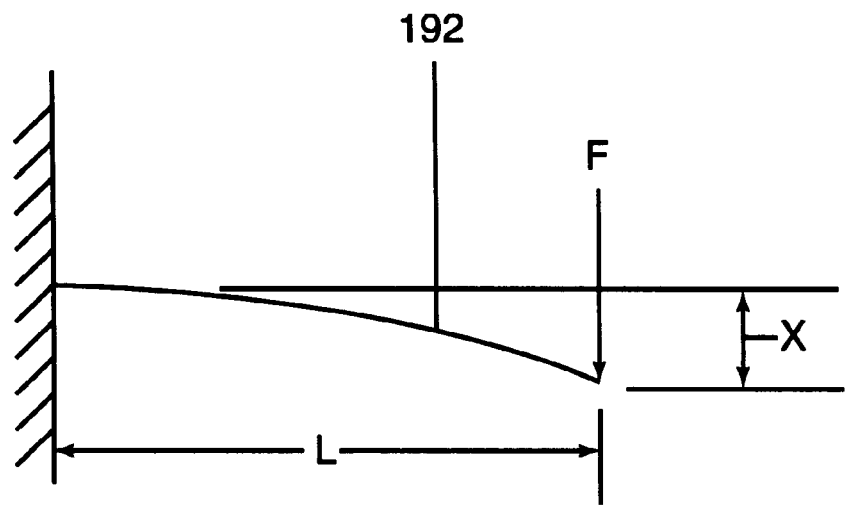
FIG. 14 is a diagram useful in analysis of the characteristics of cantilevered beam elements.

Turning to FIG. 14, shown is a simple diagram illustrating the effects of force applied to the distal end of a cantilever beam 192. The amount of displacement, x, resulting from the application of a force, F, at the distal end of a cantilever beam 192 is inversely proportional to the third power of the length, L, of the beam 192. The amount of displacement, x, can be more completely expressed by the following relationship:

$$x = -\frac{FL^3}{3EI}$$

where
x=displacement of the distal end of the cantilever beam,
F=Force applied to the cantilever beam,
L=Length of the cantilever beam,
E=Young's modulus (property of material), and
I=Bending moment of inertia (property of the cross-section of the beam).

From the foregoing, it is apparent that, for a cantilever element having all other characteristics the same, the amount of deflection created by application of a given force is primarily a function of the length of the cantilever element. This general information relating to cantilever beams can be directly applied to the gimbal portion of a head suspension to explain features, benefits and advantages of the present invention.

It should be recalled that the head slap phenomenon, which the present invention is directed toward preventing, is brought about by the application of known amounts of mechanical shock (F in the formula above). Returning now to FIG. 13, the series 850 gimbal 180 acts as a cantilever element in relationship to the stiffened beam portion 134 of a head suspension, since the gimbal 180 is fixedly attached to the stiffened beam portion at the spot welds 168, leaving the opposite end, which carries the head on the head mounting tab 188, free to move relative to the stiffened beam 134. Such movement occurs when the stiffened beam moves away from the disc (and thus away from the gimbal portion of the head suspension) as a result of applied mechanical shocks, as was discussed above.

In order to optimize a gimbal design in accordance with the present invention, it is desirable to maximize the length of the cantilever element, i.e., the gimbal portion. In the series 850 gimbal 180 of FIG. 13, the distance between the fixed end of the gimbal 180 at the closest spot weld 168 and the center of the major mass, the head mounted on the head mounting tab 188, is approximately 2.2 mm. If this length can be increased to approximately 10 mm, the free deflection of the gimbal in response to a given force can be improved by a factor of about 90.

Additionally, increasing the length of the gimbal portion of a head suspension utilizing the preloaded gimbal of the present invention would aid in manufacturing, since the comb used to separate adjacent heads during the merging of the head stack onto the disc stack can bear against the preloaded gimbals, and, in doing so, hold the gimbals closely against the stiffened beam portions of the head suspensions.

Figure 15:
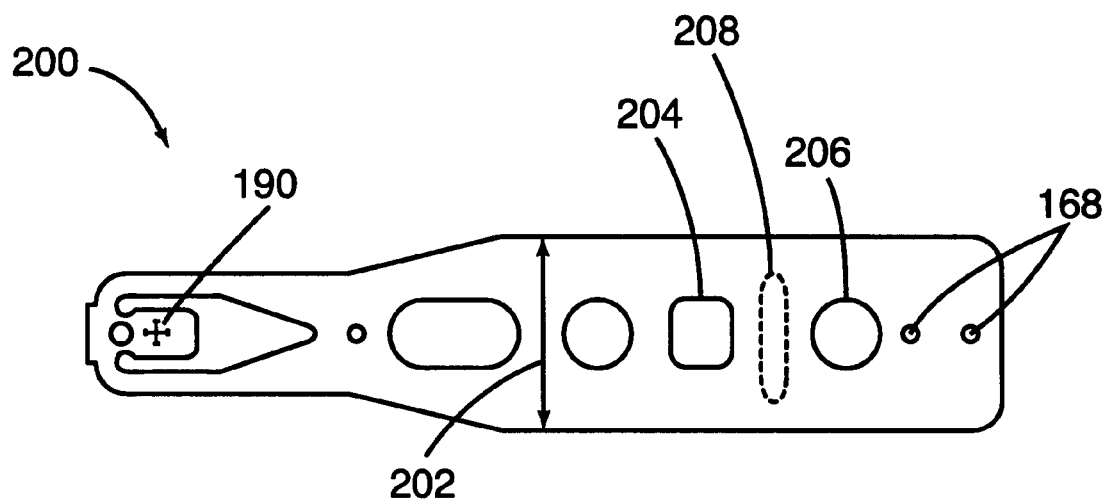
FIG. 15 is a plan view of a gimbal assembly, such as that of FIG. 13, modified in accordance with the present invention.

Turning now to FIG. 15, shown is a gimbal portion 200 modified in accordance with the present invention. The reader is invited to refer back to FIG. 13, the prior art series 850 gimbal 180, for comparison purposes during the ensuing discussion. A comparison of the prior art series 850 gimbal 180 and the gimbal 200 of the present invention reveals that the inventive gimbal 200 has been considerably lengthened. That is, the distance between the fixed spot welds 168 that attach the gimbal 200 to the stiffened beam portion and the head mounting tab has been lengthened to achieve the benefits described above. In fact, the distance from the load point dimple location 190 to the spot welds 168 has been increased from the 2.2 mm length in the series 850 prior art gimbal 180 to approximately 8.5 mm in the inventive gimbal 200.

One disadvantage of simply lengthening the gimbal is that the lateral stiffness required for proper operation is lessened. To compensate for this, the width 202 of the gimbal 200 has been increased significantly over the width of the prior art series 850 gimbal 180, from 1.60 mm to 2.45 mm. Such increases in width are possible because increasing the width of the gimbal increases the stiffness in the in-plane axes by the width increase to the third power, while increasing stiffness in the axis normal to the plane (the axis in which compliance is desired) by only the first power. To further reduce the stiffness in the desired compliant axis, additional holes 204, 206 have been introduced along the length of the gimbal 200. The first additional hole 204 is substantially square and serves to provide a more constant bending width along the length of the gimbal 200, while the second additional hole 206 also serves to provide for relief of any stresses introduced into the gimbal 200 by the spot welding process.

Finally, the dashed area 208 defines the location where the gimbal preload dimple contacts the gimbal 200 (if the dimple method described above with regard to FIG. 11 is used) to preload the gimbal 200) or the location of the application of force for plastic deformation of the gimbal 200 (if the direct forming method explained above with regard to FIG. 12 is used).

Typical deflection of the stiffened beam portion of the head suspension due to specified maximum shock loads is in the range of 1.0 to 1.5 mm. Preforming of the gimbal 200 as previously discussed results in a free deflection of approximately 0.75 mm, and the gimbal 200 of FIG. 10 produces a gimbal preload force of only 0.17 grams, or approximately 4.9% of the total load provided by the entire head suspension. With typical stiffened beam portion deflections on the order of 1.0 to 1.5 mm in response to maximum specified shocks, the free deflection of the gimbal 200 will prevent the application of any lifting force on the head at all for the first 0.75 mm of stiffened beam portion excursion, and will be sufficient to prevent lifting of the head off the disc surface by stiffened beam deflection during severe shock events.

The preloaded gimbal of the present invention is particularly useful when considering the case of "up shocks", or those shocks which tend to directly lift the head from the disc surface, and the improvement provided is most marked with the "30 series" head known in the industry. Table 1 below summarizes the improvement provided during up shocks by the preloaded gimbal of the present invention, and compares the improvement for "50 series" and "30 series" head/head suspension assemblies.

TABLE 1

| "Up Shock" Event | Separation Acceleration (Gs) | |
| --- | --- | --- |
| Gimbal Type | Series 50 | Series 30 |
| Prior Art (non-preloaded) | 165 | 195 |
| Preloaded | 221 | 515 |
| % Improvement | 34 | 164 |

An examination of Table 1 reveals that the preloaded gimbal structure of the present invention provides an improvement in separation acceleration in "50 series" head/head suspension assemblies of 34%, and more than doubles the separation acceleration for "30 series" head/head suspension assemblies, which are the types of head/head suspension assembly most commonly used in disc drives of the latest technology. Such an improvement clearly demonstrates the efficacy of the present invention.

Figure 16:
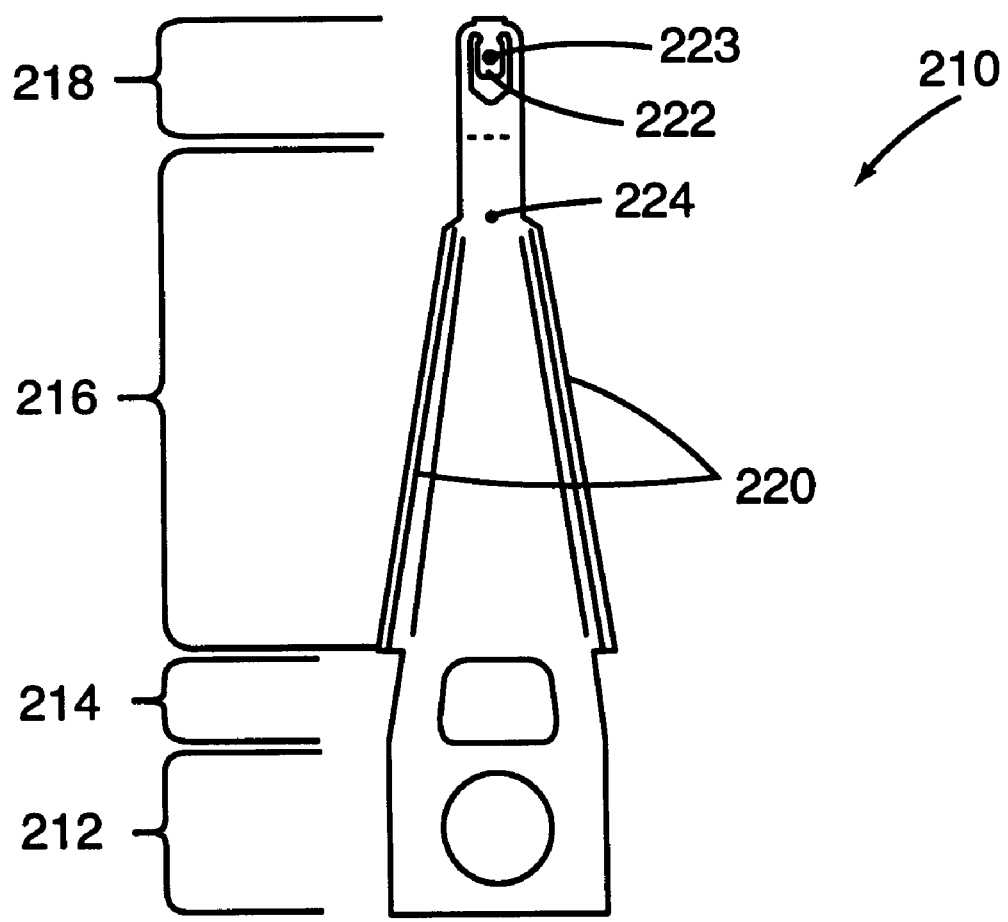
FIG. 16 is a plan view of a head suspension made in accordance with a third embodiment of the present invention.

FIG. 16 is a plan view of a head suspension 210 made in accordance with another embodiment of the present invention. Specifically, FIG. 16 shows a head suspension 210 of the type referred to in the industry as an "integrated suspension gimbal", or ISG, suspension. ISG suspensions include all of the functional portions of head suspensions noted above, and all functional elements of the suspension are fabricated from a single piece of stainless steel foil. That is, the gimbal portion of the head suspension is made as a part of the overall suspension, rather than being fabricated as a separate unit and then welded to the remaining portions of the head suspension. Details of a typical ISG suspension and methodology for fabrication thereof can be found in U.S. Pat. No. 5,504,640, issued Apr. 2, 1996, U.S. Pat. No. 5,434,7341, issued Jul. 18, 1995 and U.S. Pat. No. 5,428, 490, issued Jun. 27, 1995, all assigned to the assignee of the present application.

The ISG suspension of FIG. 16 consists of four principle portions: 1) a mounting portion 212, which is typically reinforced by a relatively robust mounting plate (not shown) to provide a rugged attachment point for connecting the suspension to the head mounting arm (116 in FIG. 1) of the disc drive actuator; 2) a load spring portion 214 which is formed to provide the load force necessary to properly fly the attached head above the disc; 3) a stiffened beam portion 216 which serves to transfer the load force generated by the load spring portion 214 to the head; and 4) a gimbal portion 218 which mounts the head, and is compliant in the roll and pitch axes of the head and stiff in the yaw and in-plane axes of the head.

In FIG. 16, it can be seen that the lateral edges of the stiffened beam portion 216 are formed out-of-plane from the major part of the stiffened beam portion 216 to form side rails 220 which contribute to the stiffness of the stiffened beam portion 216. Known prior art methods of forming the side rails 220 include simple upward or downward bends, and V-shaped or U-shaped bends. It is also known in the industry to form a part of the central portion of the stiffened beam out-of-plane to add to the stiffness of the stiffened beam portion. For more details of the forming of the stiffened beam portion 116, the reader is directed to the previously mentioned '640, '731 and '490 patents.

FIG. 16 also shows that the gimbal portion 218 includes a head mounting tab 222 to which the head is typically adhesively attached.

A load point dimple, or load point button which provides a single point contact for transferring the load force from the stiffened beam portion 216 to the head can be formed either on the head mounting tab 222, at the location shown by numerical reference 223, or formed on the stiffened beam portion 216, at the location designated by numerical reference 224. This embodiment of the present invention envisions that the head suspension 210 will be folded, or bent, to bring the contact points 223 and 224 into alignment when the head suspension 210 is in its final assembled condition, as will be discussed in more detail below.

Figure 17:
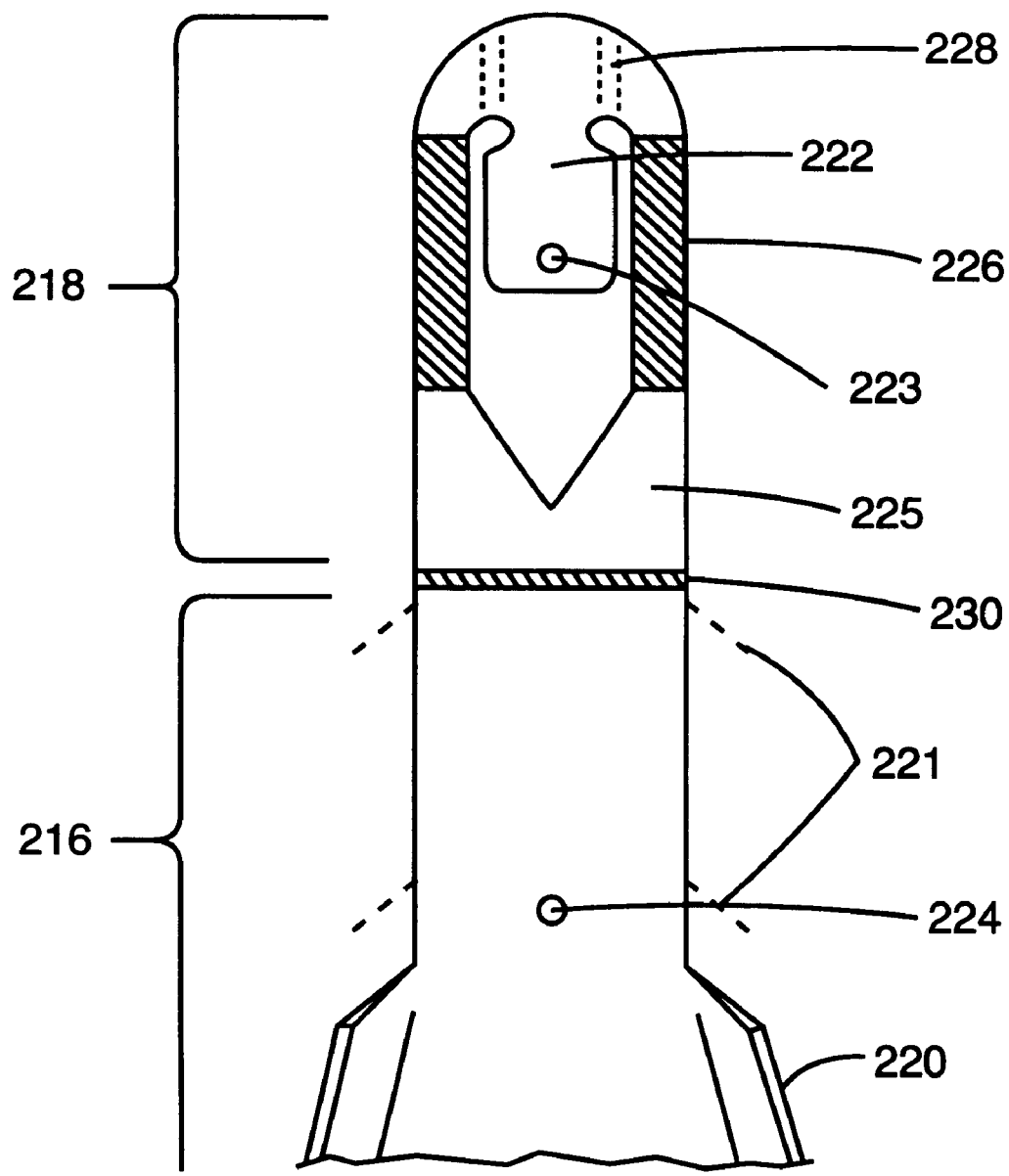
FIG. 17 is a detail plan view of a portion of the head suspension of FIG. 16.

FIG. 17 is a detail plan view of the gimbal portion 218 and a part of the stiffened beam portion 216 of the head suspension of FIG. 16.

In FIG. 17, the side rails 220 of the stiffened beam portion 116 are shown terminating slightly below the intended contact point 224 of the load point dimple. However, for specific implementation of the stiffened beam portion 216, it may be preferable to locate the termination of the side rails slightly above the contact point 224 or closer to the proximal end of the gimbal portion 218, as shown by dashed lines 221.

FIG. 17 also shows that the gimbal portion 218 of the suspension includes laterally disposed gimbal beams 226. It is envisioned that these gimbal beams 226 will be of reduced thickness relative to the remainder of the suspension, and such reduction of thickness is readily accomplished using the process of "half-etching". Details of how half-etching is used to achieve reduced thickness in selected areas are also discussed in the previously mentioned '731 patent. Reducing the thickness of the gimbal beams 226 provides the desired compliance in the roll and pitch axes of the head, while still supplying relative stiffness in the yaw and in-plane axes of the head. Again, detailed analysis of such half-etched gimbal beams can be found in the previously mentioned '640, '731 and '490 patents.

The ends of the gimbal beams 226 closest to the stiffened beam portion 216 are connected to a gimbal preload beam element 225. The manner in which the gimbal preload beam element provides preload force to the head will be discussed in detail below.

The head mounting tab 222 of the gimbal portion 218 is commonly formed out-of-plane from the rest of the gimbal portion 218 by stamp forming the suspension in the areas shown generally by dashed lines 228. Forming the head mounting tab 222 out of plane from the gimbal beams 226 allows for minor roll and pitch variations in the flying attitude of the head, without causing contact between the head and the gimbal beams 226. For reasons set forth in detail in the previously mentioned '640, '731 and '490 patents, it is preferable that the contact point 223 between the stiffened beam portion 216 and the head be located substantially between the midpoints of the gimbal beams 226.

Implementation of this embodiment of the invention envisions that the head suspension will be bent or folded at a fold point 230 such that, when the head/head suspension assembly is in its operational relationship with a disc, the contact point 223 on the head mounting tab 222 will align with the contact point 224 on the stiffened beam portion 216 of the head suspension. To facilitate this bending, and to ensure that the location of the bend point 230 is highly repeatable from unit to unit, it is envisioned that the bend point 230 will also be half etched along either its entire width, or along a portion or portions thereof. The manner in which the folding of the head suspension provides the preload fundamental to the present invention can best be seen in the following figures.

Figure 18:
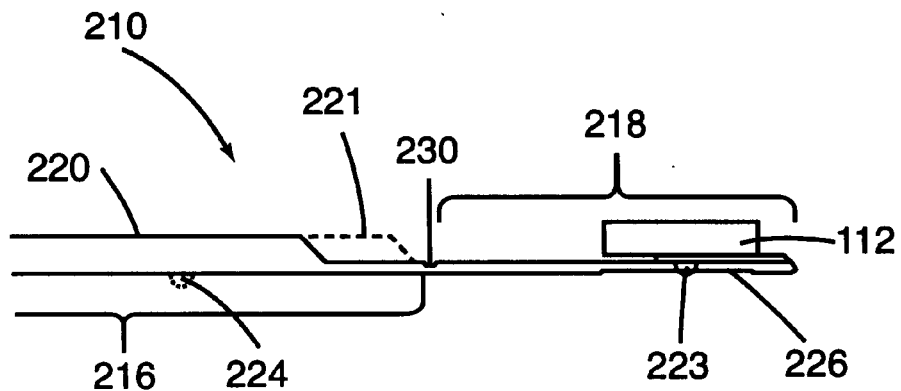
FIG. 18 is detail side elevation view of a head/head suspension assembly fabricated with the head suspension of FIGS. 11 and 12 at an intermediate fabrication stage.

FIG. 18 is a detail side elevation view of a part of the head suspension 210 of FIGS. 16 and 17 with an attached head 112. In the figure, the head suspension 210 is shown in it unbent condition, similar to the plan views of FIGS. 16 and 17. That is, the gimbal portion 218 is still coplanar with the stiffened beam portion 216.

FIG. 18 also shows the side rails 220 of the stiffened beam portion 216 formed upward out-of-plane from the main part of the stiffened beam portion 216. Again, it should be noted that the specific forming of the side rails 220 is not considered limiting to the scope of the present invention, and the stiffened beam portion 216 could also be fabricated with the side rails 220 extending to the far distal end of the stiffened beam portion as shown by dashed line 221.

An examination of FIG. 18 also reveals that a load point dimple 223 is formed in the head mounting tab (222 in FIGS. 16 and 17) and extends away from the head 112. This load point dimple 223 could be either stamp formed in the head mounting tab or formed by the process of half-etching a load point button, as described in the previously mentioned '640, '731 and '490 patents. Similarly, contact between the stiffened beam portion 216 and the head 112 could be provided by a load point dimple 224 formed on the lower surface of the stiffened beam portion 216. While maintenance of the precision of location of the load contact point relative to the head may require that the load point dimple 223 be formed on the head mounting tab, the scope of the present invention is envisioned to be broad enough to cover either location 223, 224 of the load point dimple.

Finally, FIG. 18 shows that the bend point 230 of the head suspension 210 is provided as a half etched thickness midway between the gimbal contact point 223 and the stiffened beam contact point 224.

Figure 19:
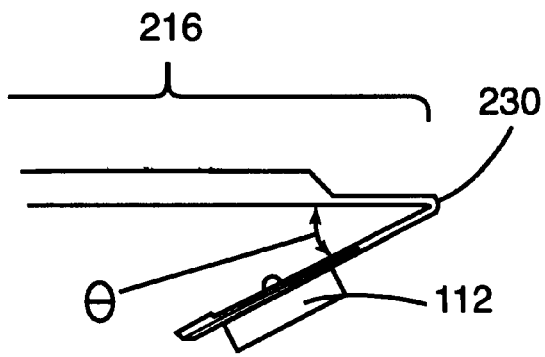
FIG. 19 is a detail side elevation view of the head/head suspension assembly of FIG. 18 in a finished, unloaded condition.

FIG. 19 shows the head suspension of FIGS. 16 through 18 in its final fabricated condition, with the gimbal portion (218 in FIGS. 16 through 18) and the attached head 112 bent back under the stiffened beam portion 216 at bend point 230.

The head suspension is formed such that, in the unloaded condition shown, the gimbal portion lies at an angle θ relative to the stiffened beam portion 216, and the angle θ is selected, along with the distance between the bend point 230 and the contact points 223, 224, to provide the desired preload to the gimbal portion, as was described above in relationship to the previously discussed embodiments.

Figure 20:
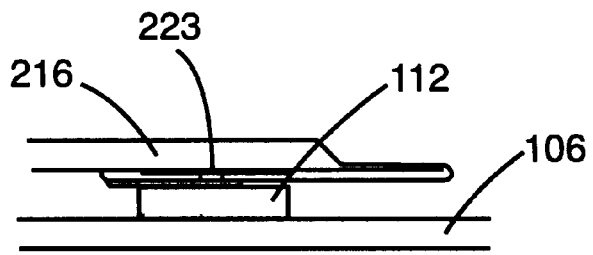
FIG. 20 is a detail side elevation view of the head/head suspension assembly of FIG. 19 as operatively engaged with a disc.

FIG. 20 shows the ISG head suspension of this embodiment of the present invention and an attached head 112 as they would be under loaded conditions in operative relationship to a disc 106. Since, as in the previously described embodiments, the preload provided to the gimbal portion by the forming of the suspension is relatively small in comparison to the overall load force provided by the load spring portion (214 in FIG. 16) of the head suspension, the gimbal portion of the head suspension is encouraged into a substantially parallel relationship to the stiffened beam portion 216 of the suspension, and single-point contact is made between the stiffened beam portion 216 and the head 112 through the load point dimple 223. When, however, a shock event occurs which tends to lift the stiffened beam portion 216 away from the disc 106, the gimbal preload provided by the bending of the head suspension will tend to prevent lifting of the head 112 away from the disc 106, and thus prevent damage to the head 112 or disc 106 caused by head slap at the termination of the shock event.

Figure 21:
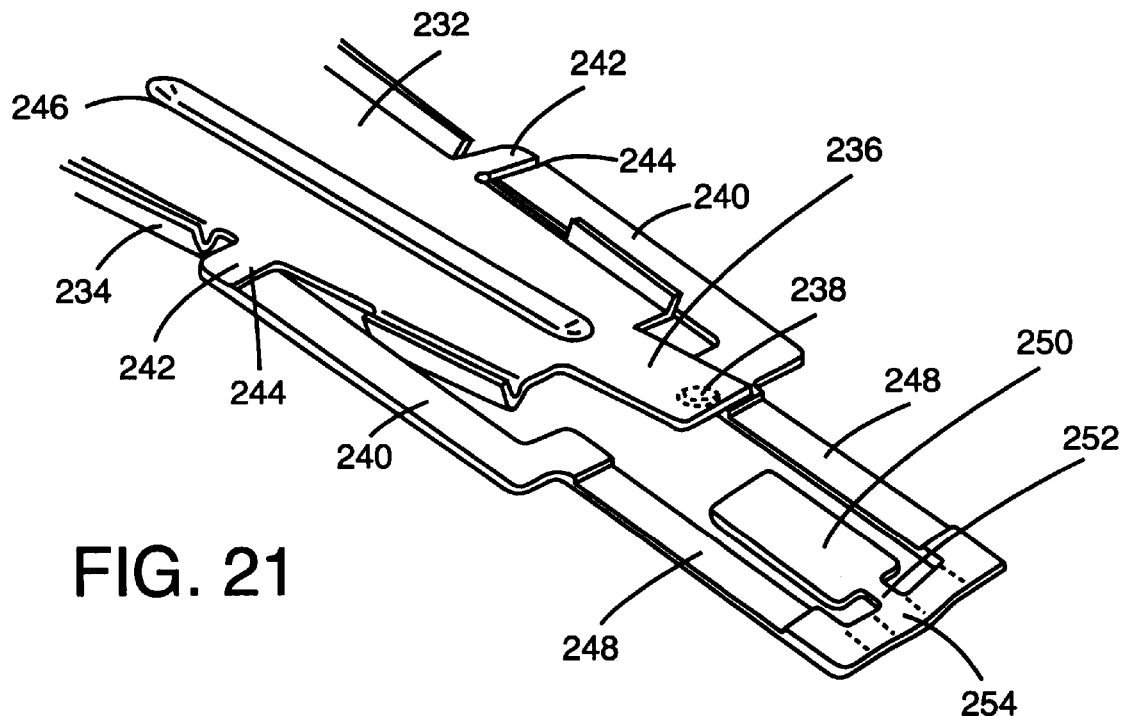
FIG. 21 is a detail perspective view of a fourth embodiment of a head suspension made in accordance with the present invention.
Figure 22:
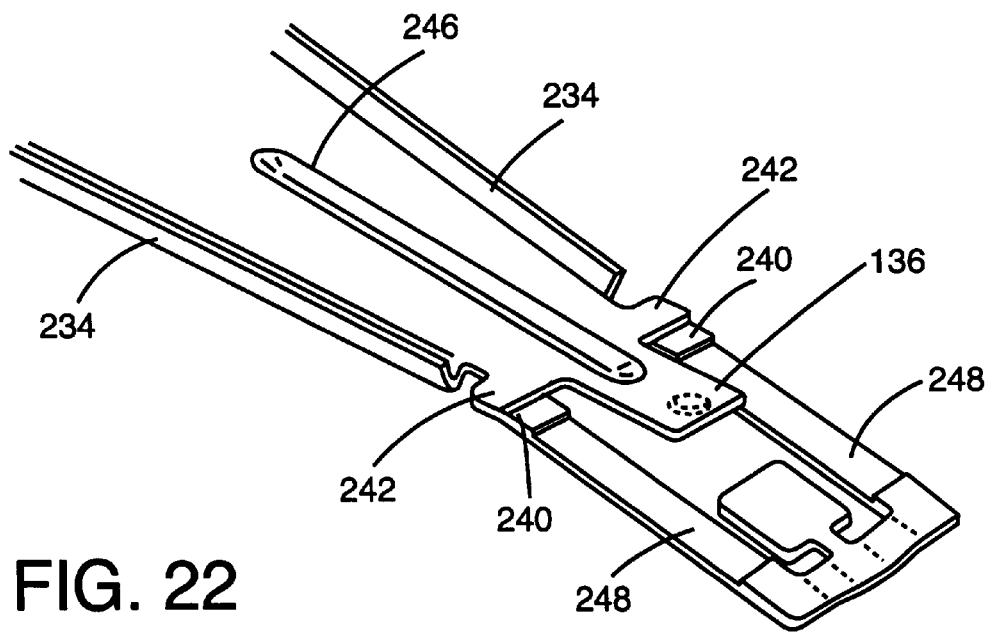
FIG. 22 is a detail perspective view of a fifth embodiment of a head suspension made in accordance with the present invention.

FIGS. 21 and 22 are detailed perspective views of alternative embodiments of ISG assemblies made in accordance with the present invention.

Turning now to FIG. 21, shown is the gimbal end of an ISG assembly that implements the present invention. The mounting portion and load spring portions (212 and 214, respectively, in FIG. 16) are not shown in the figure.

FIG. 21 shows the stiffened beam portion 232, which includes side channels 234 formed out of plane along it lateral edges to provide additional stiffness. As can be seen in the figure, the side channels 234 first bend downward and then upward to substantially the same level as the upper surface of the stiffened beam portion 232. This permits the side channels to lie within the same vertical space as will be occupied by the head (not shown) when the suspension and attached head are operatively engaged with a disc, and thus maintains a minimal vertical height for the overall assembly.

A load point tab 236 extends distally from the end of the stiffened beam portion 232 and includes a load point dimple 238 for contacting the head and providing a single contact pivot point for roll and pitch compliance. It will be evident to one of skill in the art that the load point dimple 238 could be replaced by an etched load point button as described in the previously mentioned '640, '731 and '490 patents without exceeding the envisioned scope of the present invention.

A pair of gimbal preload beams 240 extend from base tabs 242 extending laterally from the stiffened beam portion 232, and the location of the preload bend is precisely defined by half-etching at the locations designated by numerical references 244. The angle of the preload bend at 244 is selected to provide the desired amount of gimbal preload, as was discussed above in descriptions of other embodiments.

Because the side channels 234 of the stiffened beam portion 232 are interrupted by the base tabs 242, an optional stamp-formed ridge 246 can be included to restore any stiffness lost by the interruption of the side channels 234. Once again, the optional ridge 246 is stamped downward to minimize the vertical height of the assembly.

A pair of half-etched gimbal beams 248 extends longitudinally from the distal ends of the preload beams 240, and a slider mounting tab 250 lies between the gimbal beams 248. The slider mounting tab 250 is connected through a narrow neck 252 to a cross member 254 which connects the ends of the gimbal beams. The cross member 254 is formed downward and out of plane from the gimbal beams 248 to allow the head, which is adhesively attached to the lower surface of the slider mounting tab 250, to move through minor roll and pitch attitude changes without causing interference with the gimbal beams 248.

It will also be appreciated by those of skill in the art that any undesirable pitch moments imparted to the head by the inclusion of the gimbal preload angle can be effectively countered by appropriate forming of the narrow neck 252 between the slider mounting tab 250 and the cross member 254.

An analysis of FIG. 21 reveals that the specific location of the base tabs 242 along the length of the stiffened beam portions 232 can be selected to provide varying amounts of preload force, as well as varying lengths of the gimbal preload beams 240 in conformance with the discussion of the general behavior of cantilevered beam members provided above. It should also be noted that increasing the length of the gimbal preload beams 240 can be expected to correspondingly reduce the lateral and in-plane stiffness of the gimbal portion, and as such the actual length of the gimbal preload beams 240 from the base tabs 242 to the contact point between the head and the load point dimple 238 must be the subject of careful engineering consideration in the design of the head suspension.

FIG. 22 is a detail perspective view of another embodiment of the head suspension of the present invention, which can be considered as a modification of the head suspension of FIG. 21.

In FIG. 22 it can be seen that the base tabs 242 have been relocated to a location substantially at the base of the load point tab 236, and an optional stamp-formed ridge 246 is again provided should additional stiffness be required between the ends of the side channels 234 and the load point tab 236. The movement of the base tabs 242 to the base of the load point tab 236 reduces the length of the gimbal preload beams 240 to a vestigial remnant in comparison with the embodiment of FIG. 21, and thus greatly increases the lateral and in-plane stiffness of the gimbal portion of the head suspension.

It should be noted that, in the embodiments of both FIGS. 21 and 22, the location of the load point dimple 238 lies at approximately the longitudinal midpoint of the gimbal beams 248 to ensure proper operation of the gimbal as described in the previously mentioned '640, '731 and '490 patents.

From the foregoing, it is apparent that the present invention is particularly well suited to provide the benefits set forth hereinabove as well as others inherent therein. While particular embodiments of the invention have been described herein, modifications to the embodiments which fall within the envisioned scope of the invention may suggest themselves to one of skill in the art who reads this disclosure. Therefore, the scope of the invention should be considered to be limited only by the following claims.

What is claimed is:

1. A head suspension assembly for mounting and supporting a head in operative relationship to a disc in a disc drive including means for preventing separation of the head from the disc as a result of mechanical shocks applied to the disc drive in an axis substantially normal to the surface of the disc.

2. A head suspension assembly for mounting and supporting a head in operative relationship to a disc in a disc drive including:

a stiffened beam portion;

a spring portion for generating a load force for encouraging the stiffened beam portion toward the disc; and a gimbal portion comprising a mounting portion welded to the stiffened beam portion and a free portion disposed at a selected gimbal preload angle greater than about five degrees and less than about forty five degrees from the stiffened beam portion toward the disc, the free portion comprising gimbal beams and means for attaching the head;

the gimbal preload angle serving to allow a the stiffened beam portion to move away from the disc as a result of mechanical shocks applied to the disc drive in an axis substantially normal to the surface of the disc, and to produce a preload force acting on the head which prevents separation of the head from the disc.

3. A head suspension assembly as claimed in claim 2 wherein the gimbal preload angle is produced by a gimbal preload dimple formed in the stiffened beam portion at a position opposite the free portion of the gimbal portion and bearing against the free portion at a location closely adjacent the mounting portion of the gimbal portion.

4. A head suspension assembly as claimed in claim 2 wherein the gimbal preload angle is produced by a gimbal preload dimple formed in the free portion of the gimbal portion and bearing against the stiffened beam portion at a location closely adjacent the mounting portion of the gimbal portion.

5. A head suspension assembly as claimed in claim 2 wherein the gimbal preload angle is produced by plastically deforming the free portion of the gimbal portion after the mounting portion is welded to the stiffened beam portion.

6. A one-piece head suspension assembly for mounting and supporting a head in operative relationship to a disc in a disc drive including:

a stiffened beam portion;

a spring portion for generating a load force for encouraging the stiffened beam portion toward the disc; and a gimbal portion disposed at a selected gimbal preload angle greater than about five degrees and less than about forty five degrees from the stiffened beam portion toward the disc, the gimbal portion comprising gimbal preload beams, gimbal beams and means for attaching the head;

the gimbal preload angle serving to allow the stiffened beam portion to move away from the disc as a result of mechanical shocks applied to the disc drive in an axis substantially normal to the surface of the disc, and to produce a preload force acting on the head which prevents separation of the head from the disc.

7. A disc drive including a head suspension assembly for mounting and supporting a head in operative relationship to a disc in the disc drive including means for preventing separation of the head from the disc as a result of mechanical shocks applied to the disc drive in an axis substantially normal to the surface of the disc.

8. A disc drive including a head suspension assembly for mounting and supporting a head in operative relationship to a disc in the disc drive, the head suspension assembly comprising:

a stiffened beam portion;

a spring portion for generating a load force for encouraging the stiffened beam portion toward the disc; and a gimbal portion comprising a mounting portion welded to the stiffened beam portion and a free portion disposed at a selected gimbal preload angle greater than about five degrees and less than about forty five degrees from the stiffened beam portion toward the disc, the free portion comprising gimbal beams and means for attaching the head;

the gimbal preload angle serving to allow the stiffened beam portion to move away from the disc as a result of mechanical shocks applied to the disc drive in an axis substantially normal to the surface of the disc, and to produce a preload force acting on the head which prevents separation of the head from the disc.

9. A disc drive as claimed in claim 8 wherein the gimbal preload angle is produced by a gimbal preload dimple formed in the stiffened beam portion at a position opposite the free portion of the gimbal portion and bearing against the free portion at a location closely adjacent the mounting portion of the gimbal portion.

10. A disc drive as claimed in claim 8 wherein the gimbal preload angle is produced by a gimbal preload dimple formed in the free portion of the gimbal portion and bearing against the stiffened beam portion at a location closely adjacent the mounting portion of the gimbal portion.

11. A disc drive as claimed in claim 8 wherein the gimbal preload angle is produced by plastically deforming the free portion of the gimbal portion after the mounting portion is welded to the stiffened beam portion.

12. A disc drive including a one-piece head suspension assembly for mounting and supporting a head in operative relationship to a disc in the disc drive, the head suspension assembly comprising:

a stiffened beam portion;

a spring portion for generating a load force for encouraging the stiffened beam portion toward the disc; and a gimbal portion disposed at a selected gimbal preload angle greater than about five degrees and less than about forty five degrees from the stiffened beam portion toward the disc, the gimbal portion comprising gimbal preload beams, gimbal beams and means for attaching the head;

the gimbal preload angle serving to allow the stiffened beam portion to move away from the disc as a result of mechanical shocks applied to the disc drive in an axis substantially normal to the surface of the disc, and to produce a preload force acting on the head which prevents separation of the head from the disc.

\* \* \* \* \*

UNITED STATES PATENT AND TRADEMARK OFFICE
CERTIFICATE OF CORRECTION

PATENT NO.    : 6,304,420 B1
DATED         : October 16, 2001
INVENTOR(S)   : James M. Murphy et al.

It is certified that error appears in the above-identified patent and that said Letters Patent is hereby corrected as shown below:

<u>Column 19,</u>
Line 11, after "allow", delete "a".

Signed and Sealed this

Nineteenth Day of November, 2002

Attest:

JAMES E. ROGAN
Attesting Officer
Director of the United States Patent and Trademark Office